(12) United States Patent
Wevers et al.

(10) Patent No.: US 7,998,531 B2
(45) Date of Patent: Aug. 16, 2011

(54) AQUEOUS POLYOLEFIN DISPERSIONS FOR TEXTILE IMPREGNATION

(75) Inventors: Ronald Wevers, Terneuzen (NL); James G. Kennedy, Briston (GB); Aaron M. Bujnowski, Frisco, TX (US); Brad M. Moncla, Lake Jackson, TX (US); Miguel A. Prieto Goubert, Richterswil (CH); Wenbin Liang, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 115 days.

(21) Appl. No.: 12/097,403

(22) PCT Filed: Dec. 4, 2006

(86) PCT No.: PCT/US2006/046494
§ 371 (c)(1),
(2), (4) Date: Jun. 13, 2008

(87) PCT Pub. No.: WO2007/078536
PCT Pub. Date: Jul. 12, 2007

(65) Prior Publication Data
US 2009/0253321 A1    Oct. 8, 2009

(51) Int. Cl.
*B05D 3/02* (2006.01)
(52) U.S. Cl. .............. 427/389.9; 427/391; 427/392; 427/394; 427/395; 427/396
(58) Field of Classification Search .................. None
See application file for complete search history.

(56) References Cited

U.S. PATENT DOCUMENTS

| 2,621,195 | A | 12/1952 | Haslam et al. |
| 3,284,872 | A | 11/1966 | Closson et al. |
| 3,645,992 | A | 2/1972 | Elston |
| 3,708,332 | A | 1/1973 | Closson et al. |

(Continued)

FOREIGN PATENT DOCUMENTS

DE    2621195    11/1977

(Continued)

OTHER PUBLICATIONS

Willams, T., et al., The Construction of a Polyethylene Calibration Curve for Gel Permeation Chromatography Using Polystrene Fractions, Journal of Polymer Science, Polymer Letters, 1968, pp. 621-624, vol. 6, H.H. Wills Physics Laboratory, England.

(Continued)

*Primary Examiner* — Erma Cameron

(57) ABSTRACT

The present invention provides an article formed by impregnating a fibrous structure with a compound, the compound including an aqueous dispersion, the dispersion having (a) at least one polymer selected from the group consisting of an ethylene-based thermoplastic polymer, a propylene-based thermoplastic polymer, and mixtures thereof; (b) at least one polymeric stabilizing agent; and (c) water; and removing at least a portion of the water from the impregnated fibrous structure. The present invention also provides a method of forming a stiffened textile. The method may include the steps of: forming a compound, the compound including an aqueous dispersion having (a) at least one polymer selected from the group consisting of an ethylene-based thermoplastic polymer, a propylene-based thermoplastic polymer, and mixtures thereof, (b) at least one polymeric stabilizing agent, and (c) water; impregnating a textile with the compound; and removing at least a portion of the water from the impregnated textile.

26 Claims, 2 Drawing Sheets

U.S. PATENT DOCUMENTS

| | | | |
|---|---|---|---|
| 3,778,251 A | 12/1973 | Trask | |
| 3,961,124 A | 6/1976 | Matton | |
| 4,076,698 A | 2/1978 | Anderson et al. | |
| 4,507,357 A | 3/1985 | Lester et al. | |
| 4,599,392 A | 7/1986 | McKinney et al. | |
| 4,659,595 A * | 4/1987 | Walker et al. | 427/391 |
| 4,717,496 A | 1/1988 | Brehmer et al. | |
| 4,737,386 A * | 4/1988 | Wotier et al. | 427/389.9 |
| 4,798,081 A | 1/1989 | Hazlitt et al. | |
| 4,814,037 A | 3/1989 | Arnold et al. | |
| 4,988,781 A | 1/1991 | McKinney et al. | |
| 5,272,236 A | 12/1993 | Lai et al. | |
| 5,278,272 A | 1/1994 | Lai et al. | |
| 5,504,172 A | 4/1996 | Imuta et al. | |
| 5,677,383 A | 10/1997 | Chum et al. | |
| 5,756,659 A | 5/1998 | Hughes et al. | |
| 5,844,045 A | 12/1998 | Kolthammer et al. | |
| 5,869,575 A | 2/1999 | Kolthammer et al. | |
| 5,938,437 A | 8/1999 | DeVincenzo | |
| 6,111,023 A | 8/2000 | Chum et al. | |
| 6,316,549 B1 | 11/2001 | Chum et al. | |
| 6,391,380 B1 | 5/2002 | Goldberg | |
| 6,448,341 B1 | 9/2002 | Kolthammer et al. | |
| 6,455,636 B2 | 9/2002 | Sanada et al. | |
| 6,538,070 B1 | 3/2003 | Cardwell et al. | |
| 6,566,446 B1 | 5/2003 | Parikh et al. | |
| 2001/0026842 A1 | 10/2001 | Nozaki et al. | |
| 2005/0100754 A1 * | 5/2005 | Moncla et al. | 428/523 |

FOREIGN PATENT DOCUMENTS

| | | |
|---|---|---|
| GB | 935001 | 8/1963 |
| GB | 1036790 | 7/1966 |
| GB | 1062498 | 3/1967 |
| GB | 1065418 | 4/1967 |
| GB | 1182669 | 3/1970 |
| GB | 2024279 | 1/1980 |
| GB | 2091768 | 8/1982 |
| GB | 2102851 | 2/1983 |
| WO | WO-00/01745 A1 | 1/2000 |
| WO | WO-03/000810 | 1/2003 |
| WO | WO-2005/021638 | 3/2005 |
| WO | WO-2005/090427 | 9/2005 |
| WO | WO-2007/008558 | 1/2007 |

OTHER PUBLICATIONS

Wild, L., et al., Determination of Branching Distributions in Polyethylene and Ethylene Copolymers, Journal of Polymer Science: Polymer Physics Edition, 1982, pp. 441-455, vol. 20, John Wiley & Sons, Inc.

Randall, J.C., A Review of High Resolution Liquid $^{13}$Carbon Nuclear Magnetic Resonance Characterizations of Ethylene-Based Polymers, JMS-Rev. Macromol. Chem. Phys., 1989, pp. 201-317, C29 (2&3), Baytown Polymers Center, Baytown, Texas.

International Search Report (PCT/US2006/046494), May 2007.

* cited by examiner

AQUEOUS POLYOLEFIN DISPERSIONS FOR TEXTILE IMPREGNATION

BACKGROUND OF INVENTION

1. Field of the Invention

The present invention relates generally to aqueous dispersions and dispersion compounds that optionally include a filler. More specifically, the present invention relates to dispersions that are useful in the shoe industry.

2. Cross-Reference to Related Applications

This application is a 371 National Stage Application of International Application No. PCT/US2006/046494 filed on Dec. 4, 2006 entitled "AQUEOUS POLYOLEFIN DISPERSIONS FOR TEXTILE IMPREGNATION," claiming priority from the U.S. patent application Ser. No. 11/300,993, which is granted as U.S. Pat. No. 7,528,080, filed on Dec. 15, 2005 entitled "AQUEOUS POLYOLEFIN DISPERSIONS FOR TEXTILE IMPREGNATION," the teachings of which are incorporated by reference herein as if reproduced in full hereinbelow.

3. Background Art

Many shoes incorporate stiffeners, such as toe boxes (a.k.a. toe cap, toe puff) and counters to retain the shape of the shoe throughout the active life of the shoe. A counter is a piece of heavy leather or other stiffening material inserted between the outside and the lining of the upper at the back part of the shoe. The purpose of the counter is to strengthen the back part of the shoe and to prevent it from sagging and losing its shape. A toe box is a stiffener used to maintain the shape of a shoe toe, preserve toe room within the shoe, and give reasonable protection to the wearer's foot.

Processes used for the manufacture of base sheets for stiffener production include filmic processes, impregnation processes, and sintering. The preferred process to employ often depends upon the desired stiffness of the finished product. For example, there are three types of toe boxes: rigid, flexible, and soft. Rigid toes include safety shoes. Flexible toes may be flexed by thumb pressure, yet have semi-rigid walls. Soft toes include those which are intended to merely preserve the toe form and give maximum comfort to the wearer. A filmic process may be preferred for a rigid safety shoe, as materials prepared by a filmic process are often more resilient compared to impregnated materials.

In a filmic process, a thermoplastic sheet can be extruded and laminated to a low weight textile (typically 20 g/m$^2$), followed by hot melt coating of a polyurethane or polyamide adhesive. The function of the fabric is to provide a compatible layer between the extruded sheet and the adhesive layer. For example, in U.S. Pat. No. 4,814,037, a shoe stiffener is formed from multilayer coextruded plastics.

In a sintering process, a thermoplastic powder, such as a polycaprolactone or a PVC-polycaprolactone (e.g. TONE™, a linear polycaprolactone polyester available from The Dow Chemical Company) is applied onto a textile and sintered in an oven. For example, German Patent No. 2,621,195, discloses stiffening materials which are produced by melting powdered mixtures of plastics and fillers onto textile fabrics. Adhesives are then used to bind the stiffener to other parts of a shoe. In U.S. Pat. No. 4,717,496, the polyester used in the stiffening composition has both binding and adhesive properties.

In an impregnation process, a textile is impregnated with an emulsion or with a polymer solution. Impregnation systems can be water based or solvent based, and include SBR, natural and polychloroprene latexes, and styrenic polymers. The compatibility of the stiffener, fabric, and any adhesives used during shoe construction can affect the resiliency (lasting), stiffness, and shape retention of the stiffener and the shoe. For example, in GB 935,001, a heat activable shoe stiffener blank formed as a fibrous base is loaded or impregnated with PS, PVC, PVA, or an SB copolymer resin that stiffens after exposure to a solvent or to a temperature of 100° C., yet remains softenable such that the material can be reshaped as needed. U.S. Pat. No. 4,507,357, further adds to the stiffening composition a plasticizer and an aminoplast. In both of these patents, low temperature processability was desired so as to protect other shoe parts from damage during manufacture. U.S. Pat. No. 6,391,380 discloses a stiffener composition which includes a latex forming resin and a powder adhesive polyester resin. To avoid softening during storage or exposure to moderate temperatures, U.S. Pat. No. 3,961,124 employs a stiffening composition having a crosslinkable resin and a peroxide initiator, thermosetting the stiffener during shoe manufacture.

Combinations of the above processes can also be used. For example, In U.S. Pat. No. 3,708,332, fabrics were impregnated with mixtures containing polystyrene and styrene-butadiene copolymers and coated with polycaprolactone to form shoe stiffener sheets.

Other patents related to stiffening compositions and shoe stiffeners include U.S. Pat. Nos. 3,284,872, 3,778,251, and 3,961,124; British Patents GB 2,102,851, 2,091,768, 2,024, 279, 1,065,418, 1,062,498, and 1,036,790, and WO2003/000810, among others.

Impregnated systems incorporating SBR, SB, polychloroprene, or a blend of polychloroprene and natural latex are common, as noted above. Each of these systems has drawbacks such as poor resiliency, elasticity, cost, curing requirements, and allergic properties, as well as potentially poor compatibility with other components in the shoe structure. In view of these drawbacks, there exists a need for suitable replacements for or alternatives to conventional latex stiffening compositions.

SUMMARY OF INVENTION

In one aspect, the present invention relates to a stiffening composition including a thermoplastic polyolefin that is formed as an aqueous dispersion suitable for impregnating a fibrous structure. In another aspect, a fibrous structure impregnated with such a stiffening composition can provide adequate stiffness, elasticity, resilience, adhesion, and shape retention for use in shoe stiffeners, such as toe boxes, counters, and the like. Use of a thermoplastic polyolefin stiffening composition is advantageous because it can further provide improved compatibility with other components in the shoe structure.

The present invention provides an article formed by impregnating a fibrous structure with a compound, the compound including an aqueous dispersion, and thereafter removing at least a portion of the water from the impregnated fibrous structure. The aqueous dispersion can include (a) at least one polymer selected from the group consisting of an ethylene-based thermoplastic polymer, a propylene-based thermoplastic polymer, and mixtures thereof, (b) at least one polymeric stabilizing agent; and (c) water.

The present invention also provides a method of forming a stiffened textile product comprising the steps of forming a compound, the compound including an aqueous dispersion containing at least one polymer selected from the group consisting of ethylene-based thermoplastic polymers, propylene-based thermoplastic polymers, and mixtures thereof, and thereafter impregnating a suitable textile with the compound, and allowing the impregnated textile to stiffen by removing at least a portion of the water from the impregnated textile structure. The method may include the steps of: forming a compound, the compound including an aqueous dispersion having (a) at least one polymer selected from the group consisting of an ethylene-based thermoplastic polymer, a propylene-based polymer, and mixtures thereof, (b) at least one polymeric stabilizing agent; and (c) water; impregnating the textile with the compound; and allowing the impregnated textile to stiffen. The impregnation and stiffening steps may be carried out by suitable methods known to those skilled in the art Other aspects and advantages of the invention will be apparent from the following description and the appended claims.

DETAILED DESCRIPTION

Figure 1:
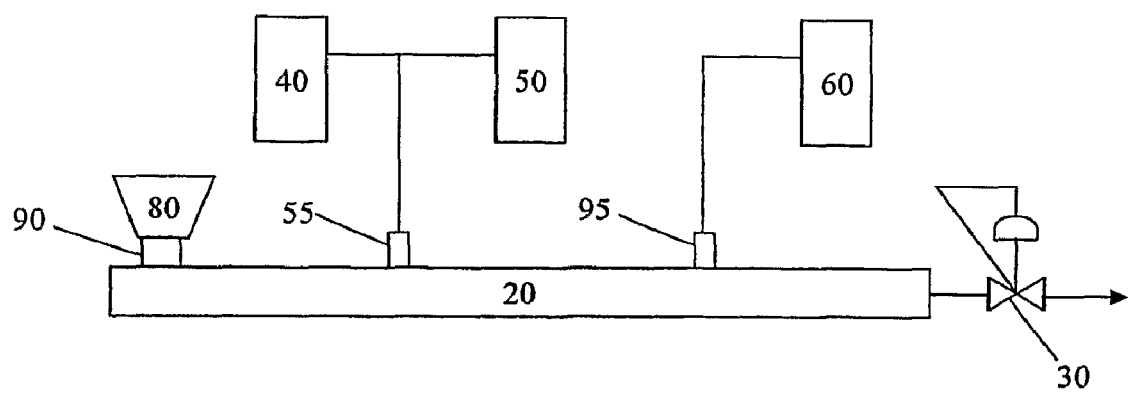
FIG. 1 shows an extruder that may be used in formulating dispersions in accordance with embodiments of the present invention.

Embodiments of the present invention relate to articles manufactured by impregnating a fibrous structure with a dispersion that includes a base polymer and a stabilizing agent. The compositions thus formed are particularly useful in the shoe industry. Embodiments of the present invention are useful for manufacturing shoe stiffeners, such as toe boxes, counters, or the like.

In certain embodiments, a filler can be added to the dispersion to form a dispersion compound. For simplicity and clarity, dispersions and dispersion compounds will generally be referred to as dispersions herein.

As used herein, "copolymer" refers to a polymer formed from two or more comonomers. As used herein, "interpolymer" refers to a copolymer in which the monomer units (two or more) are so intimately distributed in the polymer molecule that the substance is essentially homogeneous in chemical composition.

Base Polymers

Embodiments of the present invention employ ethylene-based polymers, propylene-based polymers, and propylene-ethylene copolymers as one component of a composition.

In selected embodiments, one component is formed from ethylene-alpha olefin copolymers or propylene-alpha olefin copolymers. In particular, in preferred embodiments, the base polymer comprises one or more non-polar polyolefins.

In specific embodiments, polyolefins such as polypropylene, polyethylene, and copolymers thereof, and blends thereof, as well as ethylene-propylene-diene terpolymers, may be used. In some embodiments, preferred olefinic polymers include homogeneous polymers described in U.S. Pat. No. 3,645,992 issued to Elston; high density polyethylene (HDPE) as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

Polymer compositions described in U.S. Pat. Nos. 6,566, 446, 6,538,070, 6,448,341, 6,316,549, 6,111,023, 5,869,575, 5,844,045, or 5,677,383, each of which is incorporated herein by reference in its entirety, are also suitable in some embodiments. Of course, blends of polymers can be used as well. In some embodiments, the blends include two different Ziegler-Natta polymers. In other embodiments, the blends can include blends of a Ziegler-Natta and a metallocene polymer. In still other embodiments, the polymer used herein is a blend of two different metallocene polymers. In other embodiments single site catalysts may be used.

In some particular embodiments, the polymer is a propylene-based copolymer or interpolymer. In some embodiments, the propylene/ethylene copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra.

In other particular embodiments, the base polymer may be ethylene vinyl acetate (EVA) based polymers.

In other selected embodiments, olefin block copolymers, e.g. ethylene multi-block copolymer, such as those described in the International Publication No. WO2005/090427 and U.S. patent application Ser. No. 11/376,835 may be used as the base polymer. Such olefin block copolymer may be an ethylene/α-olefin interpolymer:

(a) having a Mw/Mn from about 1.7 to about 3.5, at least one melting point, Tm, in degrees Celsius, and a density, d, in grams/cubic centimeter, wherein the numerical values of Tm and d corresponding to the relationship:

$$Tm > -2002.9 + 4538.5(d) - 2422.2(d)^2; \text{ or}$$

(b) having a Mw/Mn from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G'(25° C.), and a storage modulus at 100° C., G'(100° C.), wherein the ratio of G'(25° C.) to G'(100° C.) being in the range of about 1:1 to about 9:1.

The ethylene/α-olefin interpolymer may also:

(a) having a molecular fraction which elutes between 40° C. and 130° C. when fractionated using TREF, characterized in that the fraction having a block index of at least 0.5 and up to about 1 and a molecular weight distribution, Mw/Mn, greater than about 1.3; or (b) having an average block index greater than zero and up to about 1.0 and a molecular weight distribution, Mw/Mn, greater than about 1.3.

Those having ordinary skill in the art will recognize that the above list is a non-comprehensive listing of suitable polymers. It will be appreciated that the scope of the present invention is restricted by the claims only.

Stabilizing Agent

Embodiments of the present invention use a stabilizing agent to promote the formation of a stable dispersion or emulsion. In selected embodiments, the stabilizing agent may be a surfactant, a polymer (different from the base polymer detailed above), or mixtures thereof. In certain embodiments, the stabilizing agent is a polar polymer, having a polar group as either a co-monomer or grafted monomer. In preferred embodiments, the stabilizing agent comprises one or more polar polyolefins, having a polar group as either a co-monomer or grafted monomer. Typical polymers include ethylene-acrylic acid (EAA) and ethylene-methacrylic acid copolymers, such as those available under the tradenames PRIMACOR™, NUCREL™, and ESCOR™ and described in U.S. Pat. Nos. 4,599,392, 4,988,781, and 5,938,437, each of which is incorporated herein by reference in its entirety. Other polymers include ethylene ethyl acrylate (EEA) copolymer, ethylene methyl methacrylate (EMMA), and ethylene butyl acrylate (EBA). Those having ordinary skill in the art will recognize that a number of other useful polymers may also be used.

If the polar group of the polymer is acidic or basic in nature, the stabilizing polymer may be partially or fully neutralized with a neutralizing agent to form the corresponding salt. For example, for EAA, the neutralizing agent is a base, such as ammonium hydroxide or potassium hydroxide. In another alternative, the neutralizing agent may, for example, be any amine such as monoethanolamine, or 2-amino-2-methyl-1-propanol (AMP). Those having ordinary skill in the art will appreciate that the selection of an appropriate neutralizing agent depends on the specific composition formulated, and that such a choice is within the knowledge of those of ordinary skill in the art.

Additional surfactants that may be useful in the practice of the present invention include cationic surfactants, anionic surfactants, or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful in the practice of the present invention can be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

Fillers

Embodiments of the present invention employ a filler as part of the composition. In the practice of the present invention, a suitable filler loading in a polyolefin dispersion can be from about 0 to about 600 parts of filler per hundred parts of polyolefin. In certain embodiments, the filler loading in the dispersion can be from about 0 to about 200 parts of filler per hundred parts of a combined amount of the polyolefin and the polymeric stabilizing agent. The filler material can include conventional fillers such as milled glass, calcium carbonate, aluminum trihydrate, talc, antimony trioxide, fly ash, clays (such as bentonite or kaolin clays for example), or other known fillers.

Formulations

In preferred formulations, therefore, dispersions in accordance with the present invention may include a base polymer, which comprises at least one non-polar polyolefin, a stabilizing agent, which comprises at least one polar polyolefin, and optionally a filler. With respect to the base polymer and the stabilizing agent, in preferred embodiments, the at least one non-polar polyolefin may comprise between about 30% to 99% (by weight) of the total amount of base polymer and stabilizing agent in the composition. More preferably, the at least one non-polar polyolefin comprises between about 50% and about 80%. Still more preferably, the one or more non-polar polyolefins comprise about 70%.

With respect to the filler, typically, an amount greater than about 0 to about 1000 parts per hundred of the polymer (polymer meaning here the non-polar polyolefin combined with the stabilizing agent) is used. In selected embodiments, between about 50 to 250 parts per hundred are used. In selected embodiments, between about 10 to 500 parts per hundred are used. In still other embodiments, from between about 20 to 400 parts per hundred are used. In other embodiments, from about 0 to about 200 parts per hundred are used.

These solid materials are preferably dispersed in a liquid medium, which in preferred embodiments is water. In preferred embodiments, sufficient base is added to neutralize the resultant dispersion to achieve a pH range of between about 6 to about 14. In preferred embodiments, sufficient base is added to maintain a pH of between about 9 to about 12. Water content of the dispersion is preferably controlled so that the solids content is between about 1% to about 74% (by volume). In another embodiment, the solid content is between about 25% to about 74% (by volume). In particularly preferred embodiments, the solids range is between about 30% to about 50% (without filler, by weight).

In certain embodiments, a fibrous structure or textile impregnated with a compound can have a combined amount of the at least one polymer and the polymeric stabilizing agent in the range of about 10 to about 150 parts per hundred parts by weight of the textile. In other embodiments, a fibrous structure or textile impregnated with a compound can have a combined amount of the filler, the at least one polymer and the polymeric stabilizing agent in the range of about 10 to about 600 parts per hundred parts by weight of the textile; from about 10 to about 300 parts in other embodiments.

Dispersions formed in accordance with embodiments of the present invention are characterized in having an average particle size of between about 0.3 to about 3.0 microns. In other embodiments, dispersions have an average particle size of from about 0.5 µm to about 2.7 µm. In other embodiments, from about 0.8 µm to about 1.2 µm. By "average particle size", the present invention means the volume-mean particle size. In order to measure the particle size, laser-diffraction techniques may be employed for example. A particle size in this description refers to the diameter of the polymer in the dispersion. For polymer particles that are not spherical, the diameter of the particle is the average of the long and short axes of the particle. Particle sizes can be measured on a Beckman-Coulter LS230 laser-diffraction particle size analyzer or other suitable device.

For example, a formulation of the present invention can include surfactants, frothing agents, dispersants, thickeners, fire retardants, pigments, antistatic agents, reinforcing fibers, antioxidants, a neutralizing agent, a rheology modifier, preservatives, biocides, acid scavengers, a wetting agent, and the like. While optional for purposes of the present invention, other components can be highly advantageous for product stability during and after the manufacturing process.

In addition, embodiments of the present invention optionally include a filler wetting agent. A filler wetting agent generally may help make the filler and the polyolefin dispersion more compatible. Useful wetting agents include phosphate salts, such as sodium hexametaphosphate. A filler wetting agent can be included in a composition of the present invention at a concentration of at least about 0.5 part per 100 parts of filler, by weight.

Furthermore, embodiments of the present invention may optionally include a thickener. Thickeners can be useful in the present invention to increase the viscosity of low viscosity dispersions. Thickeners suitable for use in the practice of the present invention can be any known in the art such as for instance poly-acrylate type or associate non ionic thickeners such as modified cellulose ethers. For example, suitable thickeners include ALCOGUM™ VEP-II (trade name of Alco Chemical Corporation), RHEOVIS™ and VISCALEX™ (trade names of Ciba Ceigy), UCAR® Thickener 146, or ETHOCEL™ or METHOCEL™ (trade names of the Dow Chemical Company) and PARAGUM™ 241 (trade name of Para-Chem Southern, Inc.), or BERMACOL™ (trademark of Akzo Nobel) or AQUALON™ (trademark of Hercules) or ACUSOL® (trademark of Rohm and Haas). Thickeners can be used in any amount necessary to prepare a dispersion of desired viscosity.

The ultimate viscosity of the dispersion is, therefore, controllable. Addition of the thickener to the dispersion including the amount of filler can be done with conventional means to result in viscosities as needed. Viscosities of thus dispersions can reach +3000 cP (Brookfield spindle 4 with 20 rpm) with moderate thickener dosing (up to 4% preferably, below 3% based on 100 phr of polymer dispersion). The starting polymer dispersion as described has an initial viscosity prior to formulation with fillers and additives between 20 and 1000 cP (Brookfield viscosity measured at room temperature with spindle RV3 at 50 rpm). Still more preferably, the starting viscosity of the dispersion may be between about 100 to about 600 cP.

Also, embodiments of the present invention are characterized by their stability when a filler is added to the polymer/stabilizing agent. In this context, stability refers to the stability of viscosity of the resultant aqueous polyolefin dispersion. In order to test the stability, the viscosity is measured over a period of time. Preferably, viscosity measured at 20° C. should remain +/−10% of the original viscosity over a period of 24 hours, when stored at ambient temperature.

In a specific embodiment, a base polymer, a stabilizing agent, and a filler are melt-kneaded in an extruder along with water and a neutralizing agent, such as ammonia, potassium hydroxide, or a combination of the two to form a dispersion compound. Those having ordinary skill in the art will recognize that a number of other neutralizing agents may be used. In some embodiments, the filler may be added after blending the base polymer and stabilizing agent. In other preferred embodiments, the filler may be added after the dispersion is formed.

Any melt-kneading means known in the art may be used. In some embodiments, a kneader, a BANBURY® mixer, single-screw extruder, or a multi-screw extruder is used. A process for producing the dispersions in accordance with the present invention is not particularly limited. One preferred process, for example, is a process comprising melt-kneading the above-mentioned components according to U.S. Pat. Nos. 5,756,659 and 6,455,636.

FIG. 1 schematically illustrates an extrusion apparatus that may be used in embodiments of the invention. An extruder 20, in certain embodiments a twin screw extruder, is coupled to a back pressure regulator, melt pump, or gear pump 30. Embodiments also provide a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments, the base and initial water are preheated in a preheater.

Resin in the form of pellets, powder or flakes is fed from the feeder 80 to an inlet 90 of the extruder 20 where the resin is melted or compounded. In some embodiments, the dispersing agent is added to the resin through and along with the resin and in other embodiments, the dispersing agent is provided separately to the twin screw extruder 20. The resin melt is then delivered from the mix and convey zone to an emulsification zone of the extruder where the initial amount of water and base from the reservoirs 40 and 50 is added through inlet 55. In some embodiments, dispersing agent may be added additionally or exclusively to the water stream. In some embodiments, the emulsified mixture is further diluted with additional water inlet 95 from reservoir 60 in a dilution and cooling zone of the extruder 20. Typically, the dispersion is diluted to at least 30 weight percent water in the cooling zone. In addition, the diluted mixture may be diluted any number of times until the desired dilution level is achieved. In some embodiments, water is not added into the twin screw extruder 20 but rather to a stream containing the resin melt after the melt has exited from the extruder. In this manner, steam pressure build-up in the extruder 20 is eliminated.

Advantageously, by using an extruder in certain embodiments, the base polymer and the stabilizing agent may be blended in a single process to form a dispersion. Also, advantageously, by using one or more of the stabilizing agents listed above, the dispersion is stable with respect to the filler and other additives. Prior formulations involving polyolefin base polymers were unstable with respect to the filler.

Advantageously, polyolefin dispersions formed in accordance with the embodiments disclosed herein provide the ability to apply the dispersion to or to impregnate the dispersion into films, sheets, fabrics, or fibers and achieve good adhesive properties, and to maintain a flexible laminate. In specific embodiments, the inventors have also discovered that dispersions disclosed herein have good adhesion to polar substrates.

In some embodiments, a polyolefin dispersion or dispersion compound may be applied to a fibrous structure using any application method known to those skilled in the art. In other embodiments, a fibrous structure may be impregnated with a polyolefin dispersion or dispersion compound. In certain embodiments, fibrous structures can include textiles, geotextiles, and natural fibers. In certain embodiments, the fibrous structure may be cotton, wool, synthetic wool, cellulosics including rayon, synthetic fibers of polyamide, polyacrylonitrile, polyvinyl chloride, polyvinylidene chloride, polypropylenes, polyesters, or combinations thereof. In other embodiments, the fibrous structure may be flax, hemp, cellulose, pulp, wood, or combinations thereof.

When preparing foams, it is often preferred to froth the dispersion. Preferred in the practice of this invention is the use of a gas as a frothing agent. Examples of suitable frothing agents include: gases and/or mixtures of gases such as, air, carbon dioxide, nitrogen, argon, helium, and the like. Particularly preferable is the use of air as a frothing agent. Frothing agents are typically introduced by mechanical introduction of a gas into a liquid to form a froth. This technique is known as mechanical frothing. In preparing a frothed polyolefin backing, it is preferred to mix all components and then blend the air or gas into the mixture, using equipment such as an OAKES, MONDO, or FIRESTONE frother.

Surfactants useful for preparing a stable froth are referred to herein as foam stabilizers. Foam stabilizers are useful in the practice of the present invention. Those having ordinary skill in this field will recognize that a number of foam stabilizers may be used. Foam stabilizers can include, for example, sulfates, succinamates, and sulfosuccinamates.

Figure 2:
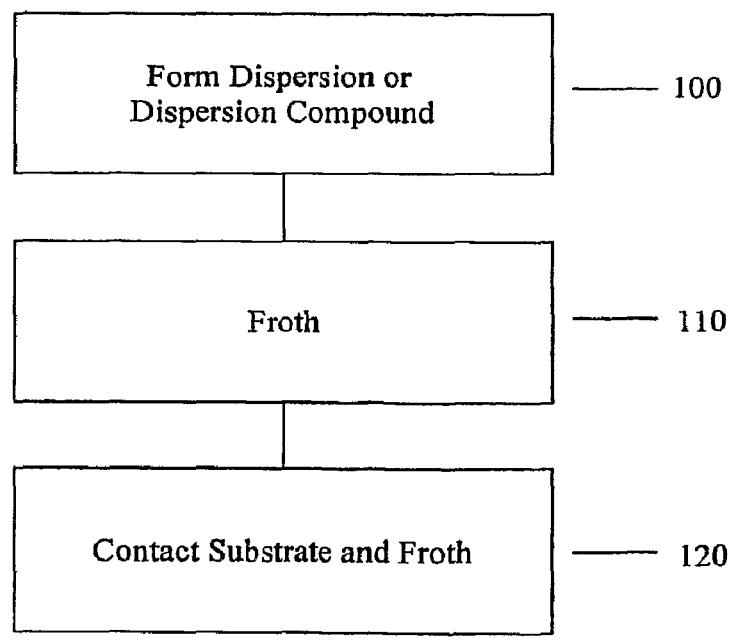
FIG. 2 shows a flowchart illustrating a method in accordance with an embodiment of the present invention.

In one embodiment of the present invention, shown in flowchart form in FIG. 2, a polyolefin dispersion is formed (ST 100). Next, the dispersion is frothed (ST 110), which may, for example, be done by mechanically mixing with air. A fabric, fiber, sheet, or film is then contacted with the froth (ST 120). For example, the froth can be coated or spread onto a fabric, or a fabric can be immersed in the froth. In selected embodiments, the polyolefin dispersion is applied at about 65° C. to about 125° C. In other embodiments, the polyolefin dispersion is applied at about 70° C. to about 120° C. In preferred embodiments, the polyolefin dispersion is applied at about 85° C. to about 95° C.

The dispersion impregnated into a substrate, for example, the fibrous structure, as described hereinabove, may be dried via any conventional drying method. Such conventional drying methods include but, are not limited to, air drying, convection oven drying, hot air drying, microwave oven drying, and/or infrared oven drying. The dispersion impregnated into a substrate, for example, the fibrous structure, as described hereinabove, may be dried at any temperature; for example, it may be dried at a temperature in the range of equal or greater than the melting point temperature of the base polymer; or in the alternative, it may be dried at a temperature in the range of less than the melting point of the base polymer. The dispersion impregnated into a substrate, for example, the fibrous structure, as described hereinabove, may be dried at a temperature in the range of about 60° F. (15.5° C.) to about 700° F. (371° C. All individual values and subranges from about 60° F. (15.5° C.) to about 700° F. (371° C. are included herein and disclosed herein; for example, the dispersion impregnated into a substrate, for example, the fibrous structure, as described hereinabove, may be dried at a temperature in the range of about 60° F. (15.5° C.) to about 500° F. (260° C., or in the alternative, the dispersion impregnated into a substrate, for example, the fibrous structure, as described hereinabove, may be dried at a temperature in the range of about 60° F. (15.5° C.) to about 450° F. (232.2° C.). The temperature of the dispersion impregnated into a substrate, for example, the fibrous structure, as described hereinabove, may be raised to a temperature in the range of equal or greater than the melting point temperature of the base polymer for a period of less than about 40 minutes. All individual values and subranges from less than about 40 minutes are included herein and disclosed herein; for example, the temperature of the dispersion impregnated into a substrate, for example, the fibrous structure, as described hereinabove, may be raised to a temperature in the range of equal or greater than the melting point temperature of the base polymer for a period of less than about 20 minutes, or in the alternative, the temperature of the dispersion impregnated into a substrate, for example, the fibrous structure, as described hereinabove, may be raised to a temperature in the range of equal or greater than the melting point temperature of the base polymer for a period of less than about 10 minutes, or in another alternative, the temperature of the dispersion impregnated into a substrate, for example, the fibrous structure, as described hereinabove, may be raised to a temperature in the range of equal or greater than the melting point temperature of the base polymer for a period in the range of about 0.5 to 600 seconds. In another alternative, the temperature of the dispersion impregnated into a substrate, for example, the fibrous structure, as described hereinabove, may be raised to a temperature in the range of less than the melting point temperature of the base polymer for a period of less than 40 minutes. All individual values and subranges from less than about 40 minutes are included herein and disclosed herein; for example, the temperature of the dispersion impregnated into a substrate, for example, the fibrous structure, as described hereinabove, may be raised to a temperature in the range of less than the melting point temperature of the base polymer for a period of less than about 20 minutes, or in the alternative, the temperature of the dispersion impregnated into a substrate, for example, the fibrous structure, as described hereinabove, may be raised to a temperature in the range of less than the melting point temperature of the base polymer for a period of less than about 10 minutes, or in another alternative, the temperature of the dispersion impregnated into a substrate, for example, the fibrous structure, as described hereinabove, may be raised to a temperature in the range of less than the melting point temperature of the base polymer for a period in the range of about 0.5 to 600 seconds.

Drying the dispersion impregnated into a substrate, for example, the fibrous structure, as described hereinabove, at a temperature in the range of equal or greater than the melting point temperature of the base polymer is important because it facilitates the formation of a film having a continuous base polymer phase with a discrete stabilizing agent phase dispersed therein the continuous base polymer phase thereby improving the oil and grease resistance as well as providing a barrier for moisture and vapor transmission.

Impregnation Control

The amount or degree to which a fibrous structure is impregnated with the compound or dispersion compound can be controlled. For example, impregnation can be controlled by pressing the fabric between calenders, removing excess material. Impregnation can additionally be controlled, for example, by adjusting one or more of the viscosity of the compound, the concentration of the combined polymer and stabilizer in the aqueous dispersion, the concentration of the filler in the compound, or the polarity of the aqueous dispersion.

In certain embodiments, the impregnated textile can have a combined amount of the at least one polymer and the polymeric stabilizing agent in the range of about 15 to about 75 parts per hundred by weight of the impregnated textile. To maintain the desired degree of impregnation, for example, in certain embodiments, the polyolefin can be controlled in the range from about 35 to about 55 percent by weight of the aqueous dispersion. In other embodiments, the polyolefin can be controlled in the range from about 40 to about 50 percent by volume of the aqueous dispersion. In other embodiments, the viscosity of the compound can be controlled in the range from about 20 to about 3000 cP.

One skilled in the art will appreciate that a desirable degree or amount of impregnation can range from a partial saturation of the fibrous structure to a complete saturation of the fibrous structure. The desired degree of impregnation can depend upon variables including the nature of the fiber being impregnated and the nature of impregnate, for example. One skilled in the art will also appreciate that the intended end properties of the impregnated structure will influence the selection of the specific ingredients (fibers and dispersions, for example) and processing parameters.

In a particular embodiment, a fibrous structure impregnated with a polyolefin dispersion can be used as a stiffener in shoes. For example, a fibrous structure can be impregnated, formed, and dried, where the forming results in an upper assembly stiffener, such as a counter or a toe puff (toe box), which can be incorporated into a shoe to assist in retaining the respective portions of the shoe in a desired configuration.

EXAMPLES

Polymer dispersions. Two polyolefin dispersions were used throughout these examples, and comprised a base polymer/stabilizing agent mix. The first was formed using a VERSIFY™ DP4200/PRIMACOR™ 5980I mixture, and the second using an ENGAGE™ 8200/PRIMACOR™ 5980I mixture, each of which is available from The Dow Chemical Company (Midland, Mich.). PRIMACOR™ 5980I is an ethylene acrylic acid copolymer (20.5 weight percent acrylic acid; MFR of 13.8, using a 2.16 kg weight at 125° C.; 0.958 g/cc); VERSIFY™ DP4200 is a propylene-based elastomer (9 mole percent ethylene; 25 MFR, using a 2.16 kg weight at 230° C.); ENGAGE™ 8200 is an ethylene-based elastomer (ethylene-octene copolymer; 5 MI; 0.870 g/cc).

The VERSIFY™ DP4200/PRIMACOR™ 5980I dispersion was produced by simultaneously feeding DP4200 pellets at 13.9 lb/hr and 5980I pellets at 2.9 lb/hr into an extruder feed funnel. Deionized water and a 25% (w/w) aqueous solution of potassium hydroxide were pumped at 19 and 8.3 cc/min, respectively, combined, heated to about 160° C., and injected into the extruder barrel at the emulsification zone, where the barrels were operated at about 150° C. Deionized water was pumped at 90 cc/min, heated to about 110° C., and injected into the extruder barrel at the dilution section where the barrels were operated at about 80° C. Product dilution was controlled at a pressure of about 300 psig. The resulting VERSIFY™ DP4200/PRIMACOR™ 5980I dispersion had a solids content of 51.6 weight percent, a pH of about 10.0, a volume-mean particle size of about 1.0 micron as measured by a Beckman Coulter LS 230, and a polydispersity (defined as the volume-mean particle size divided by the number mean particle size) of less than 2.

The ENGAGE™ 8200/PRIMACOR™ 5980I dispersion was produced by first pre-blending 8200 pellets with 5980I pellets at a 70/30 ratio. The blend was fed as ambient pellets into the extruder feed funnel at 15 lb/hr. Deionized water and a 25% (w/w) aqueous solution of potassium hydroxide were pumped at 14.6 and 15.3 cc/min respectively, combined, heated to about 130° C., and injected into the extruder barrel at the emulsification zone, where the barrels were operated at about 130° C. Deionized water was pumped at 85 cc/min, heated to about 75° C., and injected into the extruder barrel at the dilution section where the barrels were operated at about 70° C. The diluted product passed through a back-pressure regulator set at about 300 PSIG, exited the process at about 70° C., and was collected. The resulting ENGAGE™ 8200/PRIMACOR™ 5980I dispersion had a solids content of 44.9 weight percent, a pH of 10.2, a volume-mean particle size of about 1 micron as measured by a Beckman Coulter LS 230, and a polydispersity of less than 2.

Woven textile sheets. Two cotton-polyester fabrics were supplied by Forestali Srl. for fabric impregnation experiments. Fabric "A" had a weight per square meter of 321.77 g/m$^2$ and Fabric "B" had a weight of 228.85 g/m$^2$.

Dispersion formulations. The polymer dispersion described above were used to form two dispersion compounds including a calcium carbonate filler (Hydrocarb 90 GD slurry; 62.5 weight percent solids; available from Omya). The dispersion formulations evaluated are described in Table 1 below.

TABLE 1

Polyolefin dispersion formulations.

| Dispersion | Polymer Dispersion Type | Filler wt. % | wt. % | pH | Solids wt. % | Viscosity mPas |
|---|---|---|---|---|---|---|
| A | DP4200/Primacor 5980i | 66.5 | 32.5 | 9.94 | 54.39 | 110 |
| B | Engage 8200/Primacor 5980i | 66.5 | 32.5 | 10.05 | 49.81 | 90 |

Polymer dispersions and the filler slurry were weighed and mixed in a standard paper latex Heidolph Bench Stirrer at 1000 rpm for 10 minutes. The viscosity was measured in a Brookfield viscometer (spindle R3@100 RPM) pH was measured with a Knick Portamess pH meter. Solids were measured with a CEM Smart System 5.

Fabric Impregnation. Sheets were impregnated in a laboratory impregnation unit (Mathis Lab Padder, manufactured by Werner Mathis AG, Textile machinery, Laboratory equipment, Zurich). The impregnation process was performed in two steps. First, the fabric sheets were soaked in a dispersion, as described in Table 1 above, for 2 minutes at room temperature. The sheets were then pressed between calender rolls at room temperature to remove excess liquids. The desired weight per square meter was controlled by adjusting the pressure between rolls. The impregnated sheets were then dried in convection oven @ 130° C. for 7 minutes. Four samples were impregnated in this manner, and are described in Table 2.

TABLE 2

Impregnation conditions.

| Impregnated Sample | Fabric Type | Dispersion Formulation | Pressing Conditions Method | Dry (g) | Wet (g) | Dried (g) | Ratio | Impregnated Fabric (g/m²) | Before (g/m²) | Ratio |
|---|---|---|---|---|---|---|---|---|---|---|
| 1 | A | B | 3 m/min @ 1.5 bar | 10.2 | 27.92 | 17.36 | 1.71 | 556.41 | 321.77 | 1.73 |
| 2 | A | A | 3 m/min @ 1.0 bar | 10.2 | 37.2 | 23.37 | 2.3 | 749.04 | 321.77 | 2.33 |
| 3 | B | B | 3 m/min @ 1.5 bar | 6.91 | 17.22 | 11.65 | 1.69 | 373.4 | 228.85 | 1.63 |
| 4 | B | A | 3 m/min @ 1.0 bar | 6.89 | 21.85 | 14.58 | 2.12 | 467.31 | 228.85 | 2.04 |

Figure 4:
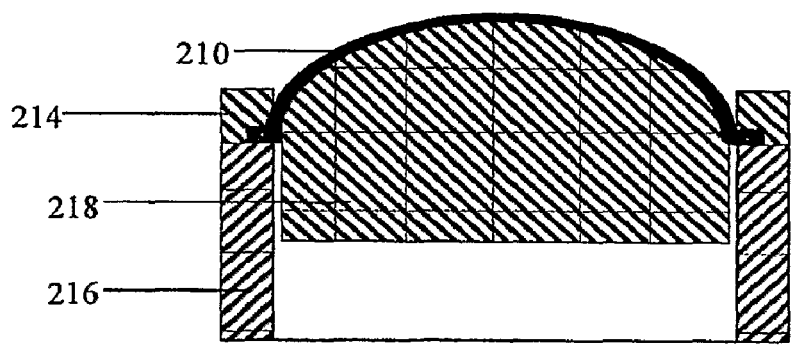
FIG. 4 is a schematic diagram of the forming tool apparatus of FIG. 3, assembled and operated so as to form a test specimen from embodiments of the present invention.
Figure 5:
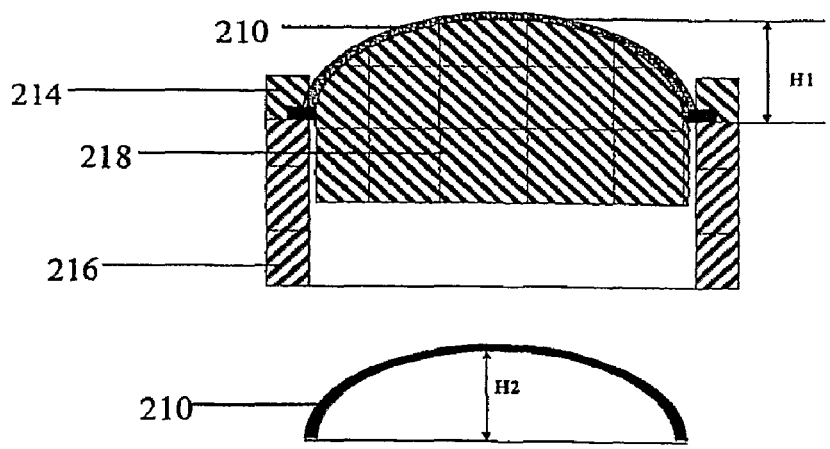
FIG. 5 illustrates the measurements obtained from the forming tool apparatus of FIG. 3 and the test specimen formed from embodiments of the present invention.

Sample Test Results. The processability and performance of the stiffeners was tested. Processability is related to VICAT and open time. Performance properties are measured according to SATRA TM83 and include hardness, area shape retention, and resiliency. For measuring these properties, a dome was thermoformed at 90° C. in a devise as illustrated in FIGS. 3, 4, and 5.

Figure 3:
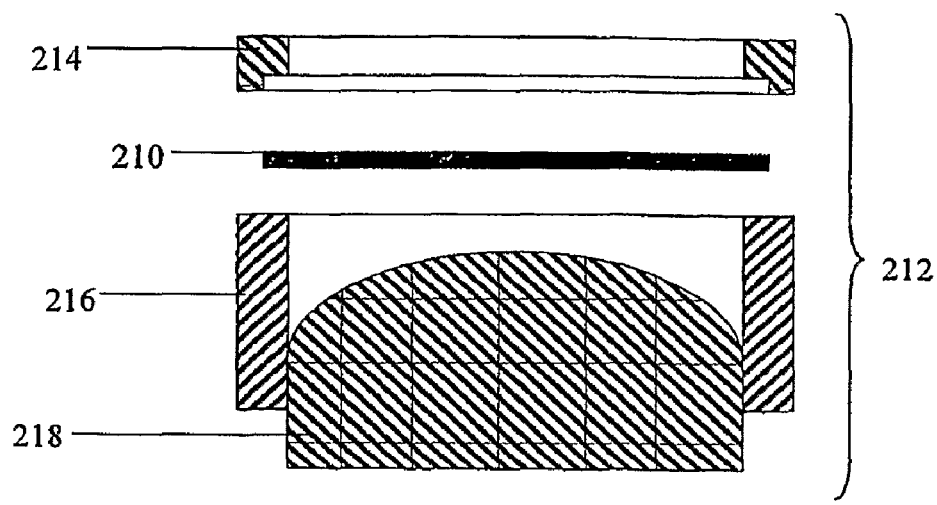
FIG. 3 is a schematic diagram of a forming tool apparatus used in testing embodiments of the present invention.

Referring to FIG. 3, a test specimen 210 was clamped in the forming tool 212, comprising a clamping ring 214, a metal cylinder 216, and a piston 218. The test specimen 210 was then heat activated by heating the assembly in an oven at 95° C. for 8.5 minutes. The heat activated assembly was removed from the oven and the test specimen 210 was promptly formed into a dome shape (within about a minute), by extending piston 218 as illustrated by FIG. 4. The formed test specimen 210 was then left in a standard controlled environment of 20° C. and 65% relative humidity in front of a fan for at least 1.5 hours.

Hardness, commonly referred to as compression strength of a formed dome, provides a measure of the strength of the stiffener in a way that corresponds to wear performance conditions. The top of the formed dome was compressed at a constant rate in a tensile testing machine using a cylindrical plunger with a level lower surface until it collapses. The maximum value was recorded as the initial hardness. This operation was repeated and after nine additional collapses, the load for the tenth collapse was measured and recorded as final hardness. Compression strength of a domed test specimen was measured according to SATRA TM83. Hardness can range from 10 N, for a fashion shoe, to 180 N for military footwear.

Area shape retention was measured according to SATRA TM83. A domed specimen was formed and the shape retention of the test specimen was determined by measuring the height of the dome. Two measurements were taken: after the first (initial compression of the dome) and a after ten collapses (final shape retention). Area shape retention is defined as:

$$ASR = 100(H1/H2)^2$$

where H1 is the height of the relevant forming tool (the dome of the metal mold) and H2 is the internal height of formed dome after first or tenth collapse, as illustrated in FIG. 5. The harder the stiffener, the higher the shape retention to avoid the deformation of the shoe.

Resiliency is calculated according to SATRA TM83, and is defined as the ratio of final hardness (after 10 load collapses) to initial hardness. Resiliency provides a measure of the resistance to small and large deformations during wear.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431 (M_{polystyrene})$.

Polyethylene equivalent molecular weight calculations are performed using Viscotek TriSEC software Version 3.0.

Density

Samples for density measurement are prepared according to ASTM D 1928. Measurements are made within one hour of sample pressing using ASTM D792, Method B.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d_2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Block Index

The ethylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI=\Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\Sigma(w_i(BI_i-ABI)^2)}{\frac{(N-1)\Sigma w_i}{N}}}$$

where N is defined as the number of fractions with $BI_i$ greater than zero. Referring to FIG. 9, for each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_x$ is the ATREF (i.e., analytical TREF) elution temperature for the ith fraction (preferably expressed in Kelvin), $P_x$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the inventive copolymer. $T_{AB}$ can be calculated from the mole fraction of ethylene (measured by NMR) using the following equation:

$$Ln\, P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments as illustrated in FIG. 8, random ethylene copolymers and/or preparative TREF fractions of random copolymers satisfy the following relationship:

$$Ln\, P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{xo}$ is the ATREF temperature for a random copolymer of the same composition (i.e., the same comonomer type and content) and the same molecular weight and having an ethylene mole fraction of $P_x$. $T_{xo}$ can be calculated from $Ln\, PX = \alpha/T_{xo} + \beta$ from a measured $P_x$ mole fraction. Conversely, $P_{xo}$ is the ethylene mole fraction for a random copolymer of the same composition (i.e., the same comonomer type and content) and the same molecular weight and having an ATREF temperature of $T_x$, which can be calculated from $Ln\, P_{xo} = \alpha/T_x + \beta$ using a measured value of $T_x$.

Once the block index (BI) for each preparative TREF fraction is obtained, the weight average block index, ABI, for the whole polymer can be calculated.

Mechanical Properties—Tensile, Hysteresis, and Tear

Stress-strain behavior in uniaxial tension is measured using ASTM D 1708 microtensile specimens. Samples are stretched with an Instron at 500% $min^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% $min^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the $1^{st}$ unloading cycle.

The samples prepared and tested as described above were compared to two commercial shoe stiffeners, Elastoform 172/ON (a raised cotton fabric impregnated with latex, commonly used in Toe Puffs) and Fenise 130/NL (a raised cotton fabric impregnated with latex, commonly used in Counters), each supplied by Forestali Srl. Results of the compression force and shape retention measurements are presented in Table 3.

TABLE 3

Comparison of property test results for impregnated fabric samples.

| Test Method Satra TM83 Property | Units | Sample | | | | Elastoform 172/ON | Fenise 130 NL |
|---|---|---|---|---|---|---|---|
| | | 1 | 2 | 3 | 4 | | |
| Sample thickness | mm | 0.89 | 1.08 | 0.73 | 0.79 | 0.73 | 1.23 |
| Initial Height | mm | 8.91 | 9.00 | 9.05 | 9.26 | 8.76 | 8.84 |
| Final Height | mm | 8.88 | 8.98 | 8.96 | 9.10 | 8.84 | 8.62 |
| Initial Shape retention | % | 91.20 | 93.05 | 94.09 | 98.40 | 88.15 | 89.67 |
| Final Shape retention | % | 90.48 | 92.53 | 92.12 | 95.13 | 89.77 | 85.36 |
| 1st Collapsing Load Hardness | N | 18.55 | 42.35 | 7.72 | 16.64 | 16.43 | 81.17 |
| 10th Collapsing Load Hardness | N | 13.76 | 31.97 | 5.37 | 10.83 | 11.06 | 48.00 |
| Resiliency | % | 74.20 | 75.50 | 69.60 | 65.05 | 67.32 | 59.14 |

The results shown above indicate that the inventive shoe stiffeners of the present invention offer a desirable balance of resiliency, shape retention, and hardness. Over a range of different hardness, from about 5 to about 32, the polyolefin impregnated samples 1-4 exhibited higher resiliency (greater than about 65) and higher shape retention (greater than about 90) than the Fenise sample (having resiliency of about 59 and shape retention between 85 and 90). The polyolefin impregnated textiles also exhibited similar and higher resiliency and shape retention versus the Elastoform comparative sample.

Sample 4, impregnated with the VERSIFY™ polyolefin dispersion has similar resiliency and better shape retention for similar hardness as compared to the Elastoform sample. Textiles impregnated with ENGAGE™ 8200 dispersions (represented by Sample A) have similar shape retention and better resiliency compared to Elastoform grade for similar hardness.

Impregnation Control. As described above, the amount of impregnation can be controlled by pressing the fabric between calenders, removing excess material. Impregnation can additionally be controlled, for example, by adjusting one or more of the viscosity of the compound, the concentration of the combined polymer and stabilizer in the aqueous dispersion, the concentration of the filler in the compound, or the polarity of the aqueous dispersion.

As an example of controlling impregnation, experiments were performed to determine the amount of impregnation realized at various dispersion solids concentrations, targeting a 20 weight percent impregnation, with the results shown in Table 4. The dispersion used was a DP4200/PRIMACOR 5980I dispersion having an initial solids concentration of 41.4 weight percent. Fabric samples used included a Boeren Bond geophysical textile, and a Don & Low sr-PP fabric.

An impregnated fabric sample was obtained by first immersing the fabric in the dispersion. The fabric, after wetting, was removed from the dispersion and the excess was allowed to drip off of the fabric. The wetted fabric was hanged vertically and dried in an oven, with additional air drying as noted. For Sample 7, a three sheet composite was formed, where only the middle sheet was immersed, followed by drying and consolidation of the sheets.

Experiment observations. Samples 6 resulted in a high clarity sheet after consolidation. In contrast, Sample 7, the sandwich composite, did not have good clarity after consolidation. Additionally, water was observed boiling out of the composite during consolidation. A drying time of 4 minutes appeared to be sufficient: the drying time for sample 9 was extended, however no additional weight loss was observed after 4 minutes.

Advantageously, one or more embodiments of the present invention provide compositions, methods, and articles having good performance in their intended applications. In one application, for example, one or more embodiments of the present invention may be used as a stiffener in shoes, such as toe puffs or counters. Additionally, one or more embodiments of the present invention provide fibrous structures impregnated with a stiffening composition having improved stiffness, elasticity, resilience, adhesion, shape retention or compatibility.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of forming an impregnated textile, the method comprising:

TABLE 4

Sample conditions and results.

| Sample | 5 | 6 | 7 | 8 | 9 | 10 | 11 |
|---|---|---|---|---|---|---|---|
| Fabric Type | D&L | D&L | D&L | BBG | BBG | BBG | BBG |
| Initial Weight (g) | 13.7 | 13.7 | 41.1 (13.5, 13.9, 13.7) | 9.1 | 9.2 | 9.3 | 9.5 |
| Dispersion Concentration | Original | Original | Original | Diluted to 62% of original concentration | Diluted to 62% of original concentration | Diluted to 30% of original concentration | Diluted to 30% of original concentration |
| Drying Conditions | 80° C. 6 min. | 80° C. 6 min | 80° C. 6 min | 100° C. 4 min | 100° C. 8 min | 100° C. 4 min | 100° C. 4 min |
| Dry Weight (g) | 33.5 | 29.8 | 77.0 | 12.5 | 12.7 | 10.3 | 10.4 |
| Percent Impregnate | 59.1 | 54.0 | 58.3 | 27.2 | 27.6 | 9.7 | 8.7 |
| Consolidation Conditions | | 150 C., 350 kN, 3 min | 150 C., 350 kN, 3 min | | | | |
| Consolidated Weight (g) | | 29.5 | 61.6 | | | | |
| Percent Impregnate | | 53.0 | 33.3 | | | | |

The concentration/viscosity of the dispersion used for samples 5-7 was too high to reach significantly low impregnate percentages without wiping excess off of the sheet prior to drying. Although the dispersion was too viscous to produce a sheet having 20 weight percent impregnate, it was noted that the dispersion adhered very well to the fabric.

After diluting the dispersion with 50% water, the dispersion adhered well, and resulted in a lower degree of fabric impregnation, however still exceeding the 20 weight percent target. Further dilution to 75% water/25% original dispersion, the solution appeared to become too polar, and dispersion flow was observed to be in domains, resulting in inhomogeneous wetting of the fabric surface. The above examples illustrate that dispersion viscosity or concentration can be used to effect the degree of impregnation.

forming a compound, the compound comprising:
an aqueous dispersion comprising:
(a) at least one polymer selected from the group consisting of an ethylene-based thermoplastic polymer, a propylene-based thermoplastic polymer, and mixtures thereof, and at least one said polymer comprises from 35 to 55 percent by weight of the aqueous dispersion;
(b) at least one polymeric stabilizing agent; and
(c) water;
impregnating a textile with the compound;
removing at least a portion of the water from the impregnated textile at temperature in the range of equal or greater than the melting point of said polymer selected from the group consisting of an ethylene-based thermoplastic polymer, a propylene-based thermoplastic polymer, and mixtures thereof; and thereby forming a coating comprising a continuous base polymer phase, and a discrete stabilizing agent phase dispersed in said continuous base polymer phase.

2. The method of claim 1, wherein the impregnated textile has a combined amount of the at least one polymer and the polymeric stabilizing agent in the range of about 10 to about 150 parts per hundred parts by weight of the textile.

3. The method of claim 2, wherein the impregnated textile has a combined amount of the at least one polymer and the polymeric stabilizing agent in the range of about 15 to about 75 parts per hundred parts by weight of the impregnated textile.

4. The method of claim 1, further comprising controlling at least one of a viscosity of the compound, a concentration of the combined polymer and stabilizer in the aqueous dispersion, or a polarity of the aqueous dispersion.

5. The method of claim 4, wherein the at least one polymer is controlled in the range from about 40 to about 50 percent by volume of the aqueous dispersion.

6. The method of claim 5, wherein the viscosity of the compound is controlled in the range from about 20 to about 3000 cP.

7. The method of claim 1, further comprising removing a portion of the water by exposing the impregnated textile to an elevated temperature.

8. The method of claim 7, wherein the temperature is from about 70 to about 120° C.

9. The method of claim 1, wherein the ethylene-based polymer is an ethylene-alpha-olefin interpolymer.

10. The method of claim 1, wherein the propylene-based polymer is a propylene-alpha-olefin interpolymer.

11. The method of claim 1, wherein the compound further comprises at least one filler, wherein the filler comprises from greater than 0 to about 200 parts per hundred parts of the combined amount of the at least one polymer and the polymeric stabilizing agent.

12. The method of claim 1, wherein the compound further comprises at least one filler, wherein the impregnated textile has a combined amount of the filler, the at least one polymer and the polymeric stabilizing agent in the range of about 10 to about 300 parts per hundred parts by weight of the textile.

13. The method of claim 1, wherein the at least one polymeric stabilizing agent comprises at least one polar polymer.

14. The method of claim 13, wherein the polar polymer comprises a polar polyolefin.

15. The method of claim 14, wherein the polar polyolefin comprises a partially or fully neutralized ethylene-acid copolymer.

16. The method of claim 15, wherein the polar polyolefin comprises at least one selected from the group consisting of ethylene-acrylic acid polymers, ethylene-methacrylic acid polymers, and combinations thereof.

17. The method of claim 1, wherein a combined amount of the at least one polymer and the at least one polymeric stabilizing agent comprises about 25 to about 74 volume percent of the aqueous dispersion.

18. The method of claim 1, wherein the aqueous dispersion has a pH from about 6 to about 14.

19. The method of claim 18, wherein the aqueous dispersion has a pH from about 9 to about 12.

20. The method of claim 1, wherein the aqueous dispersion has an average particle size from about 0.3 to about 3.0 microns.

21. The method of claim 20 wherein the aqueous dispersion has an average particle size from about 0.5 to about 2.7 microns.

22. The method of claim 1, wherein the impregnated textile comprises a fibrous structure comprising at least one selected from woven fabrics, knitted fabrics, and non-woven fabrics.

23. The method of claim 1, wherein the impregnated textile comprises a fibrous structure comprising a natural fiber selected from the group consisting of flax, hemp, cellulose, pulp, and wood.

24. The method of claim 1, wherein the impregnated textile comprises a fibrous structure comprising at least one selected from the group consisting of cotton, wool, synthetic wool, cellulosics, synthetic fibers of polyamide, polyacrylonitrile, polyvinyl chloride, polyvinylidene chloride, polypropylenes, polyesters, and combinations thereof.

25. The method of claim 1, wherein the compound further comprises at least one selected from a wetting agent, surfactants, anti-static agents, pigments, a neutralizing agent, a thickener, a rheology modifier, a biocide, a fungicide, and combinations thereof.

26. The method of claim 1, further comprising bonding, or laminating the impregnated textile to another substrate.

* * * * *